May 10, 1955     C. P. SMITH ET AL     2,707,805
MAKING FILMS AND FIBERS FROM NORMALLY
CRYSTALLINE POLYMER LATICES
Filed Sept. 4, 1951

Monomer, predominantly

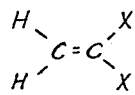

Each $x = Cl$, $Br$ or $-(CN)$

Polymerize in aqueous emulsion at least 30% solids so as to make amorphous but crystallizable particles mostly under 2000 Å diameter Deposit thin layer of emulsion on smooth surface while polymer particles are still mainly amorphous.

Dry the deposited emulsion to form a film

Heat film momentarily above melting point, then cool rapidly

Stretch the so-cooled film longitudinally to effect orientation, preferably at each of a series of successively higher temperatures below the fusion temperature Obtain film easily disintegrated longitudinally into fibers by friction INVENTORS
Cornelius P. Smith
Edgar W. Le Boeuf
Otis Ray McIntire BY Griswold & Burdick
ATTORNEYS United States Patent Office 2,707,805
Patented May 10, 1955

2,707,805

MAKING FILMS AND FIBERS FROM NORMALLY CRYSTALLINE POLYMER LATICES

Cornelius P. Smith, Fleming, and Edgar W. Le Boeuf and Otis Ray McIntire, Midland, Mich., assignors to The Dow Chemical Company, Midland, Mich., a corporation of Delaware Application September 4, 1951, Serial No. 245,093

6 Claims. (Cl. 18—57)

This invention relates to a method for making films and fibers from latex-like aqueous emulsions of normally crystalline polymers. It relates in particular to such method which is applicable to the latex obtained by the emulsion polymerization of one or a mixture of monomers, in proportion to form crystalline polymers, consisting predominantly of a compound having the formula

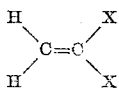

wherein each X is selected independently from the group consisting of chlorine, bromine and the cyano radical.

It is known that the vinylidine halides and vinylidene cyanide form polymers which are normally crystalline. That is, when such polymers are examined by X-ray diffraction methods they give evidence of submicroscopic crystallinity. If these crystallinty. If these crystalline polymers are melted, the crystallinity disappears. If they are chilled rapidly from the molten condition, there is a supercooling effect, and the supercooled polymers, though temporarily non-crystalline, may be recrystallized by prolonged standing or by being heated to a temperature above room temperature but below their melting point, or by being cold worked, as by rolling or stretching. Due to their normally crystalline character, they are capable of forming strong and highly oriented articles.

The conventional procedure for making films or filaments from the normally crystalline polymers (including copolymers) involves extrusion, supercooling and cold stretching. Unfortunately, the vinylidene halide and cyanide polymers and crystalline copolymers cannot be extruded to make useful products unless they are plasticized and usually it has been found necessary, as well, to include in the composition to be extruded various heat stabilizing agents. The presence of such modifiers detracts from the properties of finished films or filaments.

Attempts to produce unplasticized films or fibers from the said normally crystalline polymers by first dissolving the polymer in a solvent and then casting a film or spinning a fiber from the solution have been singularly unsuccessful. The crystalline polymers and copolymers of the vinylidene halides and cyanide are not readily soluble in any economical solvent. There is no known readily volatile solvent which is satisfactory for casting a strong, orientable film from these polymers. The only solvents which can be used for spinning fibers from the same polymers are high boiling, and accordingly difficult to use in dry spinning of the heat-sensitive polymers. Due to their initial cost and inevitable process losses, they are uneconomical to use, both in wet and dry spinning methods.

Although the normally crystalline vinylidene halide and cyanide polymers and copolymers are very useful products of commerce, their latices produced in aqueous emulsion do not find wide use in commerce, because these latices, when received by the user, cannot form continuous or coherent films if spread on a smooth surface and dried. The so-deposited solids are found to be in powder form.

It would be desirable, however, and it is an object of this invention to find a method whereby coherent, orientable films, capable of being converted into highly oriented fibers, may be made from a latex of a normally crystalline polymer or copolymer of a vinylidene halide or cyanide. A further and related object is to provide a method for the preparation of fibers, without resort to extrusion methods or to the use of solvents, from normally crystalline polymers or copolymers of vinylidene halides or cyanide.

In fulfillment of the foregoing objects, it has been found that the desired results are obtained under carefully controlled conditions, starting with an aqueous emulsion or "latex" of one of the normally crystalline polymers or copolymers. The process is illustrated in the annexed flow sheet. Specifically, it has been found that, when first prepared in aqueous emulsion, the dispersed particles of the polymeric body are temporarily amorphous or non-crystalline. Upon standing, the polymer particles gradually crystallize, as evidenced by their changing X-ray diffraction patterns. While the dispersed particles in the latex are still predominantly amorphous, the latex forms a continuous, coherent film when spread on a smooth surface and dried, and the quality of such film is dependent both on the age of the latex and on the average size of the dispersed polymer particles. The higher the ratio of amorphous to crystalline material, the better is the deposited film, and when half or more of the polymer is crystalline no useful film is obtained. The particle size is known to be a function of the emulsifier used and of the temperature employed during polymerization, and a latex of a normally crystalline polymer will not form a film unless substantially all of the particles are under 2000 Ångstrom units in diameter. Most desirabe results are obtained when most of the dispersed polymer particles have diameters under 1000 Å. After a film has been formed from such a latex, the dried film is heated momentarily to a temperature above its melting point, to destroy any crystallinity, the film is cooled rapidly and is cold stretched longitudinally to effect recrystallization and orientation. The greater the degree of orientation, the better is the fibering tendency of the film, and it is sometimes desirable to subject the oriented and recrystallized film to further stretching at progressively increasing temperatures below the crystalline melting point of the polymer concerned.

It is not a sufficient condition that the latex solids be amorphous and of the indicated small diameter. They must also be capable of crystallization. Thus, when such non-crystalline polymers as polystyrene or polyacrylonitrile are made in aqueous emulsion, it is impossible to cast a film under normal atmospheric conditions from the unmodified, i. e., unplasticized polymer latex, whether it is freshly prepared or has been aged.

The monomers which form normally crystalline polymers, and which are useful in the present invention, may be copolymerized with minor amounts of other monoethylenically unsaturated compounds to form normally crystalline copolymers which may also be used in the method of this invention. The amount of the comonomer which may be used with vinylidene chloride, vinylidene bromide, vinylidene chlorobromide, vinylidene cyanide, vinylidene chlorocyanide or vinylidene bromocyanide, to form normally crystalline copolymers, is variable, depending on the particular monomers employed. In most cases there is little or no evidence of crystallinity in a copolymer containing over 30 per cent of another unsaturated compound polymerized with the vinylidene halide or cyanide, and in many cases the amount of the said other unsaturated compound cannot exceed 15 per cent. In still other cases, the upper limit of the comonomer may be as low as 7 to 10 per cent if the copolymer is to be normally crystalline. Purely by way of illustration and not of limitation, the comonomers which may be employed include vinyl chloride, vinyl bromide vinyl acetate, acrylonitrile, methacrylonitrile, styrene, chlorostyrenes, methyl or ethyl acrylate or methacrylate and the like. When copolymerizing two or more monomers, each of which will form normally crystalline polymers, the copolymer is also normally crystalline, regardess of the proportions of the monomers employed. Thus, while a copolymer of 50 per cent vinylidene chloride and 50 per cent styrene is noncrystalline, a copolymer of equal parts of vinylidene chloride and vinylidene bromide is normally crystalline. An especially useful copolymer is that of 90 to 98 per cent vinylidene chloride and 10 to 2 per cent acrylonitrile.

It is preferred that the polymer latex employed in the present invention have from 45 to 55 per cent by weight of polymer solids dispersed in 55 to 45 per cent of water. It is preferred to use the highest attainable concentrations and is usually impossible to form films from an unplasticized latex with less than 30 per cent solids content when the solid particles are a normally crystalline polymer.

In an illustrative example, a latex of a copolymer containing about 97 per cent vinylidene chloride and 3 per cent by weight of acrylonitrile is obtained by polymerizing a mixture consisting of about 94 parts by weight of vinylidene chloride, slightly less than 3 parts of acrylonitrile, 3 parts of an anionic emulsifier such as the soluble salts of long chain alkyl sulfates or sulfonates, or petroleum hydrocarbon sulfonates or the like, and 0.3 part of potassium persulphate, in an aqueous medium, by known procedure. The polymerization is usually carried out by heating the aqueous emulsion of said mixture at temperatures between 40° and 60° C. with initial agitation, there being about 0.8 to 1.2 parts by weight of water for each part of dispersed phase. The emulsion formed is subjected to polymerization conditions for about 6 to 10 hours, by which time copolymerization is complete, and a latex of about 45 to 55 per cent solids is formed. Various stabilizing emulsifiers, such as the decyl benzene sulfonates, which serve to keep the solid copolymer particles dispersed, may be added to the emulsion in amounts of about 1 to 3 per cent by weight of the emulsion. Also, conventional protective colloids such as methyl cellulose, carboxymethyl cellulose, starch, Irish moss, or other thickening agents may be added to the latex. Usually about 0.2 to 1.5 per cent of such agent, based on the weight of latex solids, is dispersed in the latex, but the addition of such agents is not critical to the practice of the present invention.

According to the present invention, the previously-described latex, while still predominantly non-crystalline, and preferably within the first few hours of its life, is cast in the form of a thin film and is dried, suitably under infrared heating lamps. The film thus obtained is continuous and coherent but is nevertheless weak and brittle. Hence, it is most surprising that such a film may be manipulated successfully in a continuous manner. The dried film is transferred from the steel belt to a storage roll with a continuous strip of paper separating successive laps of the film on the roll. The film and paper are subsequently unrolled over a series of rollers, one of which is hot enough to heat the film momentarily to its melting point. The film is then rapidly air-cooled to room temperature and, after being separated from its supporting paper, is stretched lengthwise about 200 to 275 per cent of its original length. It is then preferable that the film be further stretched at successively higher temperatures, for example, about 80°, 120°, 140°, and 160°, each of which is below its softening point, until a total lengthwise stretch of 400 to 500 per cent of the original length, has been achieved. The so-oriented and crystalline film is strong, flexible, and has a pronounced longitudinal fibering tendency. The product obtained by stretching substantially at successively higher temperatures, below the fusion temperature, has accentuated fibering tendencies. It breaks up into fibers more completely than the product obtained by either room temperature stretching of the supercooled film, or by stretching at room temperature followed by further orientation at only one increased temperature. On brushing the surface of the cooled film, spontaneous fibering of the film is obtained. Thus, when the film is fed between a fixed stiff bristle brush and a rotary brush, a mass of fine fibers with high tensile strengths is obtained.

We claim:

1. The method which comprises polymerizing in aqueous emulsion, to produce a normally crystalline and unplasticized polymer, a monomeric material consisting predominantly of at least one compound having the formula

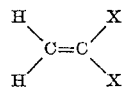

wherein each X is selected independently from the group consisting of chlorine, bromine and the cyano radical, at a monomer-to-water ratio sufficient to form a polymer emulsion of at least 30 per cent solids content by weight, and under polymerization conditions to provide most of the polymeric particles in a size under 2000 Ångstrom units in diameter, and then, while the normally crystalline polymer particles in the emulsion are still predominantly amorphous, depositing a thin layer of the emulsion on a smooth surface and drying the deposited layer to form an unplasticized film.

2. A process comprising the steps of depositing a thin layer of a polymer emulsion of at least 30 per cent solids content by weight in which substantially all the polymer particles are under 2000 Ångstrom units in diameter, and consisting predominantly of at least one compound having the formula

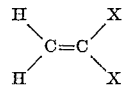

wherein each X is selected independently from the group consisting of chlorine, bromine and the cyano radical, while the normally crystalline polymer particles are still predominantly amorphous, drying the deposited layer and heating the resulting film momentarily to a temperature above its melting point, cooling the film rapidly, longitudinally stretching the film, below its melting point, sufficiently to produce crystallization and molecular orientation and to render the film capable of disintegration by friction into fibers, and, at a stage in the process after the film is dried but before it is stretched, separating the film from the surface on which it was deposited.

3. The process as claimed in claim 2, wherein substantially all the polymer particles are under 1000 Ångstrom units in diameter.

4. The process as claimed in claim 2, wherein the polymer emulsion has a solids content in the range of 45 to 55 per cent by weight.

5. The process as claimed in claim 2, wherein the polymeric solids in the emulsion consist of a copolymer of about 90 to 98 per cent vinylidene chloride and correspondingly 10 to 2 per cent acrylonitrile.

6. The process as claimed in claim 2, wherein, after the initial orientation of the film, the latter is subjected to each of several successively higher temperatures below the fusion temperature, and is stretched substantially but without rupture at each such temperature before being heated to the next such temperature, thereby to accentuate the fibering tendencies of the film.

References Cited in the file of this patent

UNITED STATES PATENTS

| | | |
|---|---|---|
| 2,185,789 | Jacgue | Jan. 2, 1940 |
| 2,509,857 | Borchert et al. | May 30, 1950 |
| 2,627,088 | Alles et al. | Feb. 3, 1953 |

FOREIGN PATENTS

| | | |
|---|---|---|
| 437,604 | Great Britain | Apr. 17, 1935 |

OTHER REFERENCES

Jackson, "Synthetic Resin Dispersions," British Plastics, pages 577–582, March 1943.